United States Patent
Do et al.

(10) Patent No.: US 10,017,076 B2
(45) Date of Patent: Jul. 10, 2018

(54) APPARATUS AND METHOD FOR CONTROLLING MOTOR FOR VEHICLE

(71) Applicant: HYUNDAI MOTOR COMPANY, Seoul (KR)

(72) Inventors: SangHwa Do, Seongnam-si (KR); Sangjin Park, Hwaseong-si (KR); Young Jin Seo, Yongin-si (KR); Kyoungbum Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/262,711

(22) Filed: Sep. 12, 2016

(65) Prior Publication Data
US 2017/0291505 A1    Oct. 12, 2017

(30) Foreign Application Priority Data
Apr. 8, 2016   (KR) .................. 10-2016-0043178

(51) Int. Cl.
*B60L 15/02* (2006.01)
*B60L 15/20* (2006.01)
(Continued)

(52) U.S. Cl.
CPC ....... *B60L 15/2045* (2013.01); *B60L 11/1803* (2013.01); *B60L 15/02* (2013.01);
(Continued)

(58) Field of Classification Search
CPC ............... B60L 15/025; B60L 15/2045; B60L 2220/12; B60L 15/02; H02P 23/20;
(Continued)

(56) References Cited

U.S. PATENT DOCUMENTS 3,917,989 A * 11/1975 Bereisa, Jr. ........... H02P 27/045
                                                          318/801
4,392,100 A *  7/1983 Stanton ............... H02P 23/0027
                                                          318/803
(Continued)

FOREIGN PATENT DOCUMENTS

DE     4404889 A1 *  8/1995 ........... B60K 7/0007
DE     4404926 A1 *  8/1995 ........ B60L 11/18047
(Continued)

OTHER PUBLICATIONS

JPO machine translation of JP 01-270789 (original JP document published Oct. 30, 1989) (Year: 1989).*
(Continued)

*Primary Examiner* — Behrang Badii
*Assistant Examiner* — David A Testardi
(74) *Attorney, Agent, or Firm* — McDermott Will & Emery LLP (57) ABSTRACT

A motor control apparatus for a vehicle includes a data detector detecting driving data and a vehicle controller controlling a drive motor according to the driving data. The vehicle controller includes an acceleration generator determining a request torque and a request speed using the driving data and generating a request acceleration using the request torque and the request speed; a driving point determinator selecting an inductance control current map or a motor efficiency control current map according to the request acceleration and determining a current driving point according to the request torque and the request speed using the selected current map; and a motor controller controlling the drive motor using the current driving point.

11 Claims, 4 Drawing Sheets

(51) Int. Cl.
  *H02P 21/00* (2016.01)
  *B60L 11/18* (2006.01)
  *H02P 23/14* (2006.01)

(52) U.S. Cl.
  CPC .......... *H02P 21/0021* (2013.01); *H02P 23/14* (2013.01); *B60L 2240/14* (2013.01); *B60L 2240/423* (2013.01); *B60L 2240/429* (2013.01); *B60Y 2300/60* (2013.01)

(58) Field of Classification Search
  CPC .. H02P 21/0021; H02P 23/0027; H02P 23/14; Y02T 10/643
  See application file for complete search history.

(56) References Cited

U.S. PATENT DOCUMENTS

| | | | | |
|---|---|---|---|---|
| 4,818,927 A * | 4/1989 | Hino | ............... | H02P 23/08 318/798 |
| 5,444,351 A * | 8/1995 | Yamamura | ............ | B60L 15/025 318/432 |
| 5,740,880 A * | 4/1998 | Miller | ............... | B62D 5/046 180/446 |
| 5,758,014 A * | 5/1998 | Young | ............... | B60L 3/10 318/434 |
| 5,801,508 A * | 9/1998 | Obayashi | ............ | B60L 15/025 318/139 |
| 6,118,247 A * | 9/2000 | Obayashi | ............ | B60L 11/12 318/705 |
| 6,222,335 B1 * | 4/2001 | Hiti | ............... | B60L 11/1803 318/432 |
| 6,327,524 B1 * | 12/2001 | Chen | ............... | B60L 11/14 318/825 |
| 7,378,814 B2 * | 5/2008 | Gaetani | ............... | H02P 6/08 318/700 |
| 7,545,116 B2 * | 6/2009 | Nagata | ............... | H02P 21/09 318/727 |
| 7,825,620 B2 * | 11/2010 | Nakatsugawa | ......... | H02P 21/06 318/490 |
| 7,960,928 B2 * | 6/2011 | Tang | ............... | B60L 15/025 318/400.02 |
| 8,508,162 B2 * | 8/2013 | Choi | ............... | B60L 15/025 318/400.02 |
| 9,096,135 B1 * | 8/2015 | Simonini | ............ | B60L 11/1803 |
| 2004/0074681 A1 * | 4/2004 | Ono | ............... | B60L 11/1803 180/65.1 |
| 2006/0192510 A1 * | 8/2006 | Okazaki | ............ | B60L 11/1803 318/139 |
| 2007/0251236 A1 * | 11/2007 | Barthelet | ............ | H02P 23/0004 60/608 |
| 2008/0315824 A1 * | 12/2008 | Arakawa | ............ | H02P 21/08 318/800 |
| 2012/0169268 A1 * | 7/2012 | Choi | ............... | B60L 15/025 318/767 |
| 2014/0132196 A1 * | 5/2014 | Maloum | ............ | H02P 21/0003 318/717 |
| 2014/0277888 A1 * | 9/2014 | Dastoor | ............ | B60L 15/20 701/22 |
| 2016/0028337 A1 * | 1/2016 | Goetting | ............ | H02P 6/185 318/400.02 |
| 2016/0043678 A1 * | 2/2016 | Doc | ............... | H02P 21/0003 318/400.02 |

FOREIGN PATENT DOCUMENTS

| | | | | |
|---|---|---|---|---|
| EP | 1454787 A2 * | 9/2004 | .......... | B60L 15/2045 |
| FR | 3018647 A1 * | 9/2015 | | |
| JP | 01270789 A * | 10/1989 | | |
| JP | 2012143144 A * | 7/2012 | .......... | B60L 15/025 |
| JP | 2015-050857 A | 3/2015 | | |
| KR | 10-2012-0077498 A | 7/2012 | | |
| KR | 10-1535036 B1 | 7/2015 | | |
| KR | 10-1542960 B1 | 8/2015 | | |
| KR | 10-2016-0032894 A | 3/2016 | | |
| KR | 10-1646467 B1 | 8/2016 | | |
| WO | 2009/090386 A2 | 7/2009 | | |
| WO | 2013-065525 A1 | 5/2013 | | |

OTHER PUBLICATIONS

Tesla blog, "Induction Versus DC Brushless Motors", Jan. 9, 2007, https://www.tesla.com/blog/induction-versus-dc-brushless-motors, 3 pages (Year: 2007).*

Widmer, James D. et al., "Electric vehicle traction motors without rare earth magnets", Sustainable Materials and Technologies 3, 2015, pp. 7-13 (Year: 2015).*

* cited by examiner

APPARATUS AND METHOD FOR CONTROLLING MOTOR FOR VEHICLE

CROSS-REFERENCE TO RELATED APPLICATION

This application claims the benefit of priority to Korean Patent Application No. 10-2016-0043178, filed on Apr. 8, 2016 in the Korean Intellectual Property Office, the entirety of which is incorporated herein by reference.

TECHNICAL FIELD

The present disclosure relates to a motor control apparatus for a vehicle. More particularly, the present disclosure relates to an apparatus and method for controlling a motor for a vehicle that can control a drive motor in consideration of a rotor inductance.

BACKGROUND

Currently, as environment pollution has become a more serious problem, use of pollution-free energy has become more important. In particular, air pollution in large cities has gradually become more serious, and vehicle exhaust gas is one of the major sources thereof.

Accordingly, in order to reduce the amount of exhaust gas and to provide more efficient fuel consumption, environmentally-friendly vehicles including hybrid vehicles and electric vehicles have been developed and driven.

An environmentally-friendly vehicle may be a vehicle that does not discharge an exhaust gas. Such an environmentally-friendly vehicle may include a pure electric vehicle that drives using the power of a motor, a hybrid electric vehicle that combines and drives using the power of a motor and an engine, and a fuel cell vehicle that drives using the power of a motor driven by electricity that is generated in a fuel cell.

Such an environmentally-friendly vehicle mounts a high voltage battery as an electric power source that drives a drive motor and a converter.

Currently, a drive motor uses a field coil motor rather than a permanent magnet motor.

Here, because the field coil motor may be formed without a rare earth metal and has a wide driving area, the field coil motor may be a representative motor that can replace a permanent magnet motor. By winding a coil to an iron core of each of a stator and a rotor and by applying a current thereto, the field coil motor generates a torque.

Because such a field coil motor may replace a permanent magnet for generating a field magnet magnetic flux with a coil, the field coil motor has different electrical response characteristics according to a field magnet current. In particular, when a drive motor drives with a maximum efficiency control that minimizes a loss, it is advantageous in efficiency, but a dynamic response performance thereof may be deteriorated due to an increase in rotor inductance.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and method for controlling a motor for a vehicle that is capable of controlling a drive motor in consideration of a rotor inductance.

The present disclosure has been made in an effort to further provide an apparatus and method for controlling a motor for a vehicle that is capable of controlling a drive motor by minimizing a rotor inductance based on acceleration.

An exemplary embodiment in the present disclosure provides a motor control apparatus for a vehicle including: a data detector detecting driving data and a vehicle controller controlling a drive motor according to the driving data. The vehicle controller includes an acceleration generator determining a request torque and a request speed using the driving data and generating a request acceleration using the request torque and the request speed; a driving point determinator selecting an inductance control current map or a motor efficiency control current map according to the request acceleration and determining a current driving point according to the request torque and the request speed using the selected current map; and a motor controller controlling the drive motor using the current driving point.

The driving point determinator may determine a current driving point according to the request torque and the request speed using the inductance control current map, if the request acceleration is equal to or larger than a reference value.

The driving point determinator may determine a plurality of current driving points according to the request torque and the request speed, if the request acceleration is equal to or larger than the reference value, extract a rotor inductance according to each of the plurality of current driving points from the inductance control current map, and determine a current driving point according to a minimum rotor inductance among the extracted rotor inductances.

The motor controller may control a drive motor using a current and a current phase angle of the current driving point.

The vehicle controller may further include a current map generator that generates at least one of the inductance control current map and the motor efficiency control current map.

The current map generator may extract a basic rotor inductance according to a basic current driving point through finite element analysis, determine at least one current driving point according to a motor torque and a motor speed within a predetermined range, generate a rotor inductance according to at least one current driving point using the basic rotor inductance, and generate an inductance control current map by matching a rotor inductance to the at least one current driving point.

The driving point determinator may determine a current driving point according to a request torque and a request speed using the motor efficiency control current map, if the request acceleration is less than the reference value.

Another embodiment of the present invention provides a method in which a motor control apparatus for a vehicle controls a drive motor including: determining a request torque and a request speed using driving data; generating request acceleration using the request torque and the request speed; determining whether the request acceleration is equal to or larger than a reference value; determining a current driving point using an inductance control current map when the request acceleration is equal to or larger than the reference value; and controlling the drive motor using the current driving point.

According to an exemplary embodiment, because a drive motor can be controlled in consideration of a rotor inductance, fuel consumption can be improved and driving satisfaction can be enhanced.

Further, by minimizing a rotor inductance based on acceleration, the drive motor can be controlled and thus responsiveness can be improved.

In addition, an effect that may be obtained or estimated due to an exemplary embodiment of the present invention is directly or implicitly described in a detailed description of an exemplary embodiment in the present disclosure.

That is, various effects that are estimated according to an exemplary embodiment in the present disclosure will be described within a detailed description to be described later.

DETAILED DESCRIPTION OF THE EMBODIMENTS

Hereinafter, an operation principle of an apparatus and method for controlling a motor for a vehicle according to an exemplary embodiment in the present disclosure will be described in detail with reference to the accompanying drawings and description. However, drawings shown hereinafter and a detailed description to be described later relate to an exemplary embodiment among several exemplary embodiments for effectively describing a characteristic of the present disclosure. Therefore, the present disclosure is not limited to only the following drawing and description.

Detailed descriptions of well-known functions and structures incorporated herein may be omitted to avoid obscuring the subject matter of the present disclosure. The terms used herein are defined in consideration of functions in the present invention and may vary depending on a user's or an operator's intension and usage. Therefore, the terms used herein should be understood based on the descriptions made herein.

Further, the following exemplary embodiment may use terms by appropriately changing, integrating, or separating to be clearly understood by a person of ordinary skill in the art in order to efficiently describe a core technical characteristic of the present invention, but the present invention is not limited thereto.

Hereinafter, an exemplary embodiment in the present disclosure will be described in detail with reference to the accompanying drawings.

Figure 1:
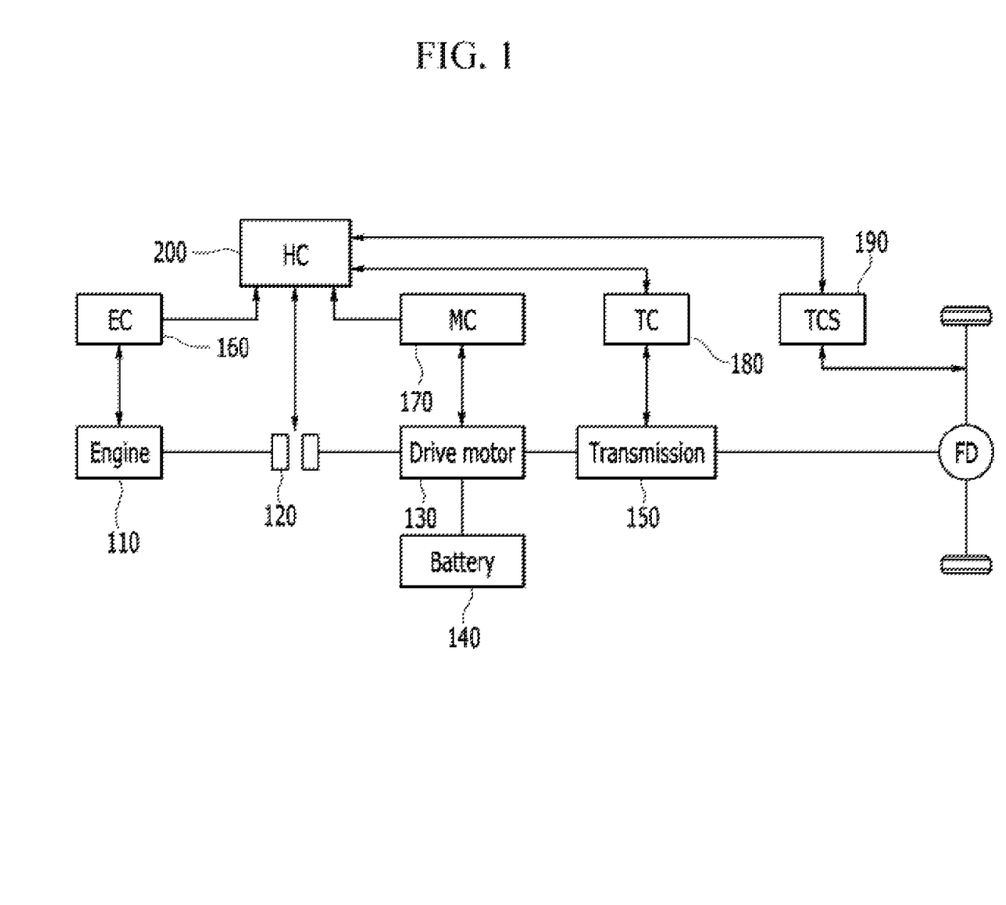
FIG. 1 is a diagram illustrating an environmentally-friendly vehicle including a motor control apparatus according to an exemplary embodiment in the present disclosure.

FIG. 1 is a diagram illustrating an environmentally-friendly vehicle including a motor control apparatus according to an exemplary embodiment in the present disclosure.

That is, for better comprehension and ease of description, FIG. 1 illustrates a hybrid electric vehicle as an example of an environmentally-friendly vehicle as an exemplary embodiment. Therefore, a method of controlling a motor for a vehicle according to an exemplary embodiment may be applied to other environmentally-friendly vehicles as well as the hybrid electric vehicle of FIG. 1.

Referring to FIG. 1, an environmentally-friendly vehicle includes an engine 110, an engine clutch 120, a drive motor 130, a battery 140, a transmission 150, an engine controller 160 (hereinafter, referred to as an 'EC'), a motor controller (hereinafter, referred to as an 'MC') 170, a transmission controller (hereinafter, referred to as a 'TC') 180, a traction control system (hereinafter, referred to as a 'TCS') 190, and a hybrid controller (hereinafter, referred to as an 'HO') 200.

A thrust of the engine 110 is controlled by the control of the EC 160, and driving thereof is controlled to an optimal driving point according to the control of the EC 160.

The engine clutch 120 is disposed between the engine 110 and the drive motor 130 and operates according to the control of the HC 200 to connect or disconnect power delivery between the engine 110 and the drive motor 130. That is, the engine clutch 120 connects or disconnects power between the engine 110 and the drive motor 130 according to a switch between an Electric Vehicle (EV) mode and a Hybrid Electric Vehicle (HEV) mode.

When the engine clutch 120 is opened, the environmentally-friendly vehicle may be driven only by the drive motor 130, and when the engine clutch 120 is locked, the environmentally-friendly vehicle may be driven by only the engine 110 or by the engine 110 and the drive motor 130.

The drive motor 130 is operated by a three phase AC voltage that is applied from the MC 170 to generate a torque. The drive motor 130 is operated as a generator upon coasting or regenerative braking to supply a voltage to the battery 140.

The battery 140 is formed of a plurality of unit cells, and at the battery 140, a high voltage for providing a driving voltage to the drive motor 130 is stored. The battery 140 supplies a driving voltage to the drive motor 130 in an EV mode or an HEV mode and is charged with a voltage that is generated in the motor upon regenerative braking.

When a commercial power source is plug-in connected, the battery 140 may be charged by a voltage and a current that are supplied through a charging device.

The transmission 150 adjusts a shift ratio according to the control of the TC 180, distributes an output torque that is added and applied through the engine clutch 120 with a shift ratio according to a driving mode to transfer the distributed output torque to a driving wheel, thereby enabling the environmentally-friendly vehicle to be driven.

The EC 160 is connected with the HC 200 through a network and is interlocked with the HC 200 to control general operations of the engine 110 according to an engine operation state such as a driver's demand torque signal, a coolant temperature, an engine speed, a throttle valve opening level, an intake amount, an oxygen amount, and an engine torque. The EC 160 provides an operation state of the engine 110 to the HC 200.

The MC 170 controls driving and torque of the drive motor 130 according to the control of the HC 200 and stores a voltage that is generated in the drive motor 130 upon regenerative braking at the battery 140.

The TC 180 controls a shift ratio according to each output torque of the EC 160 and the MC 170 and controls general operations of the transmission 150 such as determination of a regenerative braking amount. The TC 180 provides an operation state of the transmission 150 to the HC 200.

The TCS 190 is a safety system that controls a driving torque of the environmentally-friendly vehicle in order to prevent a tire from slipping with an excessive driving torque upon starting or accelerating on a snowy road, an icy road, or an uneven road.

The TC 180 and the TCS 190 may cooperate to adjust a fuel injection amount, ignition timing, and a throttle valve to control an output torque of the engine 110 and to simultaneously control an output torque of the drive motor 130 through power distribution.

The HC 200 is an uppermost control unit that controls hybrid driving mode setting and general operations of the environmentally-friendly vehicle. The HC 200 integrally controls subordinate control units that are connected through a network, collects and analyzes information of each subordinate control unit, executes a cooperation control, and controls an output torque of the engine 110 and the drive motor 130.

In an environmentally-friendly vehicle according to the present exemplary embodiment, common operations are executed equally to or similarly to that of a conventional environmentally-friendly vehicle and therefore a detailed description thereof will be omitted.

Figure 2:
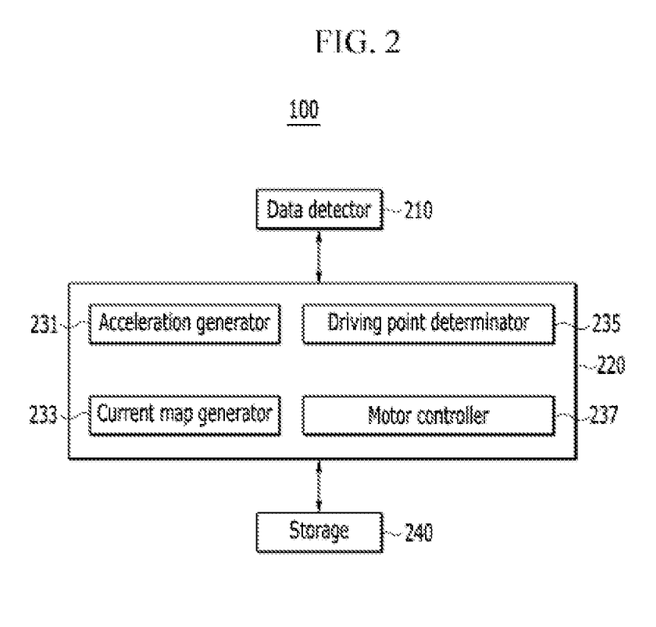
FIG. 2 is a block diagram illustrating a configuration of a motor control apparatus according to an exemplary embodiment in the present disclosure.

FIG. 2 is a block diagram illustrating a configuration of a motor control apparatus according to an exemplary embodiment in the present disclosure. In a method of controlling a motor for a vehicle according to an exemplary embodiment to be described later, some processes may be performed by the MC 170 and some other processes may be performed by the EC 160 or the HC 200. Therefore, the EC 160, the MC 170, the TC 180, the TCS 190, and the HC 200 according to an exemplary embodiment in the present disclosure are referred to as a vehicle controller, and for convenience of description, in this specification and claims, unless stated otherwise, the EC 160, the MC 170, the TC 180, the TCS 190, and the HC 200 are referred to as a vehicle controller.

Referring to FIG. 2, a motor control apparatus 100 includes a data detector 210, a vehicle controller 220, and a storage 240.

The data detector 210 detects driving data for controlling the drive motor 130. That is, when the vehicle drives, the data detector 210 detects general driving data including a vehicle speed, a gear shift stage, a displacement of an accelerator pedal, and a displacement of a brake pedal. The data detector 210 provides the detected driving data to the vehicle controller 220.

The vehicle controller 220 controls the drive motor 130 based on driving data. For this reason, the vehicle controller 220 includes an acceleration generator 231, a current map generator 233, a driving point determinator 235, and a motor controller 237.

The acceleration generator 231 determines a request torque and a request speed and generates request acceleration using the request torque and the request speed. In other words, the acceleration generator 231 determines a request torque and a request speed based on driving data that are detected in the data detector 210. The acceleration generator 231 generates request acceleration using the request torque and the request speed.

The current map generator 233 generates at least one of an inductance control current map and a motor efficiency control current map for extracting a current driving point for controlling the drive motor 130. In this case, the inductance control current map may represent a map in which a rotor inductance is matched to each of a plurality of current driving points, and the motor efficiency control current map may represent a map in which motor efficiency is matched to each of a plurality of current driving points.

In other words, the current map generator 233 extracts magnetic flux interlinkage according to a motor speed and a current driving point through finite element analysis and a basic rotor inductance according to an iron loss and a basic current driving point. Technology that is related to a finite element analysis method is well-known technology that is presently widely known in the art and therefore a detailed description thereof will be omitted.

The current map generator 233 determines at least one current driving point according to a motor torque and a motor speed within a predetermined range. The current map generator 233 generates a rotor inductance according to at least one current driving point using the basic rotor inductance and matches the rotor inductance to each of at least one current driving point to generate an inductance control current map.

The current map generator 233 generates motor loss data according to a motor torque and a motor speed within a predetermined range. Here, motor loss data may represent the total sum of an iron loss, a copper loss, and a mechanical loss. The current map generator 233 generates a motor parameter according to a motor torque and a motor speed using motor loss data. In this case, the motor parameter may include at least one of motor efficiency, a voltage, and a power factor. By matching motor efficiency to each of at least one current driving point, the current map generator 233 generates a motor efficiency control current map.

Here, finite element analysis is exemplified, but the present invention is not limited thereto, and any analysis method that can extract a magnetic flux, an iron loss, and a rotor inductance may be used.

The driving point determinator 235 selects an inductance control current map or a motor efficiency control current map based on request acceleration. That is, if request acceleration is equal to or larger than a reference value, the driving point determinator 235 selects an inductance control current map and determines a current driving point according to a request torque and a request speed using the inductance control current map.

If request acceleration is less than a reference value, the driving point determinator 235 selects a motor efficiency control current map and determines a current driving point according to a request torque and a request speed using the motor efficiency control current map.

The motor controller 237 controls the drive motor 130 using the current driving point. That is, the motor controller 237 receives a current driving point from the driving point determinator 235 and controls the drive motor 130 using a current and a current phase angle of the received current driving point.

For such an object, the vehicle controller 220 may be implemented into at least one processor operating by a predetermined program, and the predetermined program may be programmed to perform each step of the vehicle motor control apparatus 100 according to an exemplary embodiment in the present disclosure.

The storage 240 stores necessary data in constituent elements of the motor control apparatus 100 and data that are generated in the motor control apparatus 100. For example, the storage 240 may store driving data that are detected in the data detector 210 and may store an inductance control current map and a motor efficiency control current map that are generated in the vehicle controller 220. The storage 240 may store a request speed and a request torque that are determined in the vehicle controller 220 and request acceleration that is generated in the vehicle controller 220 and may store a current driving point that is extracted from the inductance control current map or the motor control current map.

Further, the storage 240 may store various programs for controlling general operations of the motor control apparatus 100.

The storage 240 may provide necessary data according to a request of the data detector 210 and the vehicle controller 220. The storage 240 may be formed with an integrated memory or may be divided into a plurality of memories. For example, the storage 240 may be formed with a ROM (Read Only Memory), a RAM (Random Access Memory), and a flash memory.

Hereinafter, a method of controlling a motor for a vehicle according to an exemplary embodiment in the present disclosure will be described with reference to FIGS. 3 and 4. Constituent elements of the vehicle controller 220 according to an exemplary embodiment that is described with reference to FIG. 2 may be integrated or subdivided, and constituent elements of the vehicle controllers 220 that perform the above-described function regardless of a corresponding name may be constituent elements of the vehicle controller 220 according to the exemplary embodiment. Hereinafter, when describing a method of controlling a motor in a vehicle motor control apparatus 100 according to an exemplary embodiment, a subject of each step is the vehicle controller 220 instead of corresponding constituent elements and the vehicle controller 220 will be mainly described.

Figure 3:
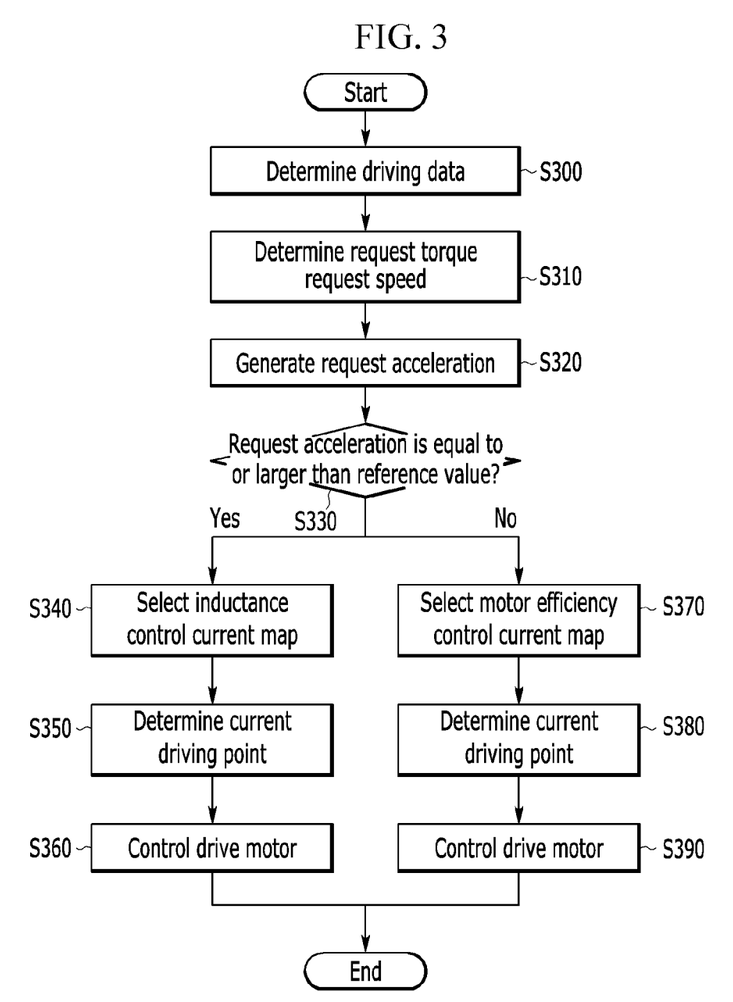
FIG. 3 is a flowchart illustrating a method of controlling a motor according to an exemplary embodiment in the present disclosure.

FIG. 3 is a flowchart illustrating a method of controlling a motor according to an exemplary embodiment in the present disclosure.

Referring to FIG. 3, when a vehicle is being driven, the vehicle controller 220 determines driving data (S300). That is, the data detector 210 detects driving data including a displacement of a vehicle speed and an accelerator pedal and provides the detected driving data to the vehicle controller 220. The vehicle controller 220 receives and determines driving data from the data detector 210.

The vehicle controller 220 determines a request torque and a request speed based on the driving data (S310). That is, when a driver requests a sports mode, the vehicle controller 220 may generate a request torque and a request speed using the driving data. For example, the driver may request a sports mode through an input device such as a button within the vehicle.

The vehicle controller 220 generates request acceleration using a request torque and a request speed (S320).

The vehicle controller 220 determines whether request acceleration is equal to or larger than a reference value (S330). Here, a reference value may be a value to be a reference for selecting a current map based on request acceleration. The reference value may be set through a predetermined algorithm (e.g., program and probability model).

If the request acceleration is equal to or larger than a reference value, the vehicle controller 220 selects an inductance control current map (S340).

The vehicle controller 220 determines a current driving point according to a request torque and a request speed using the inductance control current map (S350). In other words, the vehicle controller 220 determines a plurality of current driving points according to a request torque and a request speed and extracts a rotor inductance according to each of a plurality of current points from an inductance control current map to generate an inductance candidate group. The vehicle controller 220 determines a minimum rotor inductance in the inductance candidate group. The vehicle controller 220 determines a current driving point according to the minimum rotor inductance. The current driving point is determined according to a minimum rotor inductance because an acceleration performance of the drive motor 130 can be improved when controlling the drive motor 130 by minimizing a rotor inductance.

The vehicle controller 220 controls the drive motor 130 using the current driving point (S360). That is, the vehicle controller 220 controls the drive motor 130 using a current and a current phase angle of the current driving point that is determined at step S350.

If request acceleration is less than a reference value, the vehicle controller 220 selects a motor efficiency control current map (S370).

The vehicle controller 220 determines a current driving point according to a request torque and a request speed using the motor efficiency control current map (S380). Specifically, the vehicle controller 220 determines a plurality of current driving points according to a request torque and a request speed. The vehicle controller 220 determines motor efficiency according to each of a plurality of current driving points in the motor efficiency control current map. The vehicle controller 220 determines highest motor efficiency of a plurality of motor efficiency and determines a current driving point according to the highest motor efficiency.

The vehicle controller 220 controls the drive motor 130 using a current and a current phase angle of the current driving point that is determined at step S380 (S390).

As described above, in a method of controlling a motor according to an exemplary embodiment in the present disclosure, because the drive motor 130 may be controlled by minimizing a rotor inductance based on an inductance control current map, an acceleration performance of the drive motor 130 can be improved, fuel consumption can be improved, and a driver's driving satisfaction can be enhanced.

Figure 4:
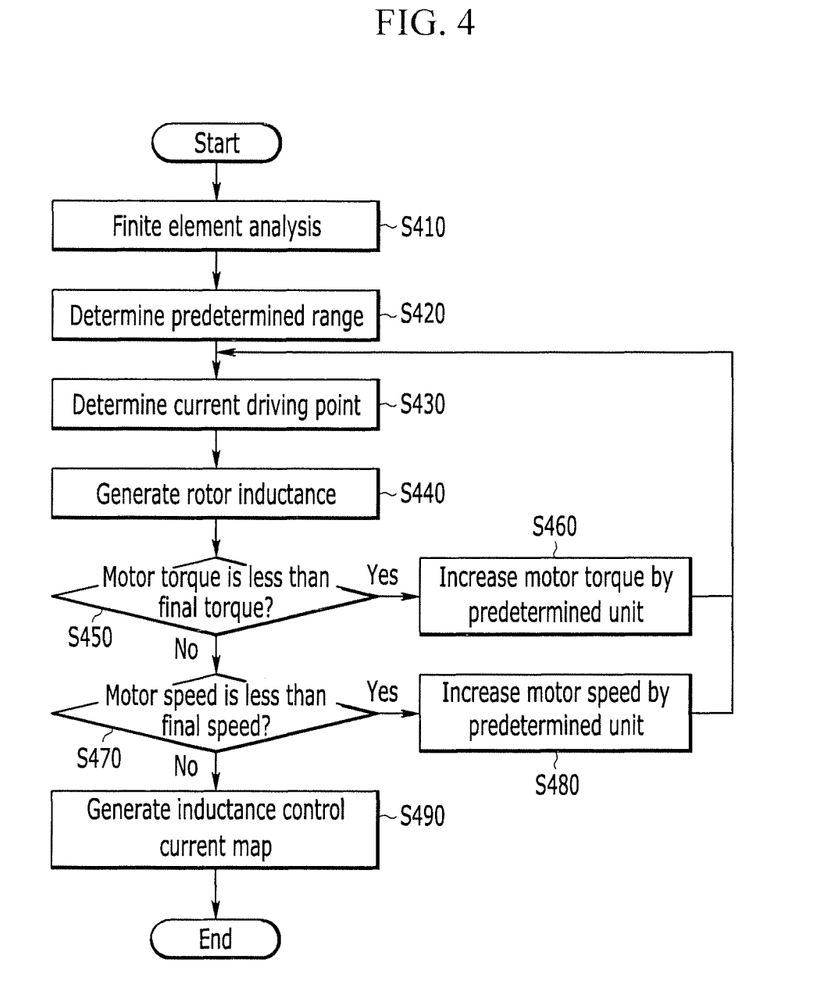
FIG. 4 is a flowchart illustrating a method of generating a current map according to an exemplary embodiment in the present disclosure.

FIG. 4 is a flowchart illustrating a method of generating a current map according to an exemplary embodiment in the present disclosure.

Referring to FIG. 4, the vehicle controller 220 extracts a basic rotor inductance through finite element analysis (S410). In other words, the vehicle controller 220 extracts a magnetic flux, an iron loss, and a basic rotor inductance according to a speed, a current, and a current phase angle through finite element analysis.

The vehicle controller 220 determines a predetermined range (S420). That is, the vehicle controller 220 may determine a predetermined range of a motor torque and determine a predetermined range of a motor speed.

Here, a predetermined range may represent a range of a motor torque and a range of a motor speed for generating a current map. The predetermined range may be set by an operator or may be set through a predetermined algorithm (e.g., program and probability model).

For example, a predetermined range of a motor torque may be 10 Nm to 150 Nm, and a predetermined range of a motor speed may be 1000 rpm to 6000 rpm.

The vehicle controller 220 determines at least one current driving point according to a motor torque and a motor speed within a predetermined range (S430). That is, when starting generation of a current map, the vehicle controller 220 may determine at least one current driving point according to a start motor torque and a start motor speed in a predetermined range. For example, the start motor torque may be 10 Nm, and the start motor speed may be 1000 rpm.

The vehicle controller 220 generates a rotor inductance according to at least one current driving point (S440). In other words, the vehicle controller 220 generates a rotor inductance according to each of at least one current driving point using the basic rotor inductance that is determined at the step S410.

The vehicle controller 220 generates a rotor inductance according to at least one current driving point (S440). In other words, the vehicle controller 220 generates a rotor inductance according to each of at least one current driving point using the basic rotor inductance that is determined at the step S420.

The vehicle controller 220 determines whether a motor torque is less than a final torque (S450). Here, the final torque may represent a final motor torque in a predetermined range. For example, the final torque may be 150 Nm.

If a motor torque is less than a final torque, the vehicle controller 220 increases the motor torque by a predetermined unit (S460). Here, the predetermined unit may represent a torque amount for increasing a motor torque and may be set by an operator or may be set through a predetermined algorithm (e.g., program and probability model). For example, a predetermined unit of the motor torque may be 10 Nm. The vehicle controller 220 may increase the motor torque by a predetermined unit and repeat a process after step S430.

If a motor torque corresponds with a final torque, the vehicle controller 220 determines whether a motor speed is less than a final speed (S470). Here, the final speed may represent a final motor speed in a predetermined range. For example, the final speed may be 6000 rpm.

If a motor speed is less than a final speed, the vehicle controller 220 increases the motor speed by a predetermined unit (S480). In this case, the predetermined unit may represent a magnitude of the motor speed for increasing the motor speed and may be set by an operator or may be set through a predetermined algorithm (e.g., program and probability model). A predetermined unit of the motor speed may be 1000 rpm. The vehicle controller 220 may increase the motor speed by a predetermined unit and repeat a process after step S430.

If a motor speed corresponds with a final speed, the vehicle controller 220 matches a rotor inductance to a plurality of current driving points to generate an inductance control current map (S490). That is, by matching a rotor inductance to a plurality of current driving points that are determined by repeating steps S430 to S480, the vehicle controller 220 generates an inductance control current map.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motor control apparatus for a vehicle, the motor control apparatus comprising:
   a data detector detecting driving data;
   a vehicle controller controlling a drive motor according to the driving data, wherein the vehicle controller is configured to:
   determine a driver's request torque and a driver's request speed using the driving data,
   generate a driver's request acceleration using the request torque and the request speed,
   select an inductance control current map or a motor efficiency control current map according to the request acceleration, and
   determine a current driving point according to the request torque and the request speed using the selected current map; and
   a motor controller controlling the drive motor using the current driving point,
   wherein the vehicle controller is further configured to
   determine a plurality of current driving points according to the request torque and the request speed when the request acceleration is equal to or larger than the reference value,
   extract a rotor inductance according to each of the plurality of current driving points from the inductance control current map, and
   determine a current driving point according to a minimum rotor inductance among the extracted rotor inductances.

2. The motor control apparatus of claim 1, wherein the vehicle controller is configured to
   determine a plurality of current driving points according to the request torque and the request speed when the request acceleration is equal to or larger than the reference value,
   extract a rotor inductance according to each of the plurality of current driving points from the inductance control current map, and
   determine a current driving point according to a minimum rotor inductance among the extracted rotor inductances.

3. The motor control apparatus of claim 1, wherein the motor controller controls a drive motor using a current and a current phase angle of the current driving point.

4. The motor control apparatus of claim 1, wherein the vehicle controller is further configured to generate at least one of the inductance control current map and the motor efficiency control current map.

5. The motor control apparatus of claim 4, wherein the vehicle controller is further configured to
   extract a basic rotor inductance according to a basic current driving point through finite element analysis,
   determine at least one current driving point according to a motor torque and a motor speed within a predetermined range,
   generate a rotor inductance according to at least one current driving point using the basic rotor inductance finite element analysis, and
   generate an inductance control current map by matching a rotor inductance to the at least one current driving point.

6. The motor control apparatus of claim 1, wherein the vehicle controller is further configured to determine a current driving point according to the request torque and the request speed using the motor efficiency control current map when the request acceleration is less than the reference value.

7. A method in which a motor control apparatus for a vehicle controls a drive motor, the method comprising steps of:
   determining a driver's request torque and a driver's request speed using driving data;
   generating a driver's request acceleration using the request torque and the request speed;
   determining whether the request acceleration is equal to or larger than a reference value;
   determining a current driving point using an inductance control current map when the request acceleration is equal to or larger than the reference value; and
   controlling the drive motor using the current driving point, wherein the step of determining the current driving point comprises steps of:
  determining a plurality of current driving points according to the request torque and the request speed when the request acceleration is equal to or larger than the reference value;
  generating an inductance candidate group by extracting a rotor inductance according to each of the plurality of current driving points through the inductance control current map;
  determining a minimum rotor inductance in the inductance candidate group; and
  determining a current driving point according to the minimum rotor inductance.

8. The method of claim 7, wherein the step of controlling the drive motor comprises controlling the drive motor using at least one of a current and a current phase angle of the current driving point.

9. The method of claim 7, further comprising a step of generating an inductance control current map by matching a rotor inductance to at least one current driving point through finite element analysis, before the step of determining the current driving point using an inductance control current map.

10. The method of claim 9, wherein the step of generating the inductance control current map comprises steps of:
  extracting a basic rotor inductance according to a basic current driving point through the finite element analysis;
  determining at least one current driving point according to a motor torque and a motor speed within a predetermined range;
  generating a rotor inductance according to the at least one current driving point using the finite element analysis; and
  generating an inductance control current map by matching a rotor inductance to the at least one current driving point.

11. The method of claim 7, further comprising, after the step of determining of whether the request acceleration is equal to or larger than the reference value:
  extracting a current driving point using the motor efficiency control current map when the request acceleration is less than the reference value; and
  controlling the drive motor using the current driving point.

* * * * *